M. L. SENDERLING.
VEHICLE.
APPLICATION FILED MAY 22, 1911.
1,095,127.
Patented Apr. 28, 1914.
6 SHEETS—SHEET 3.
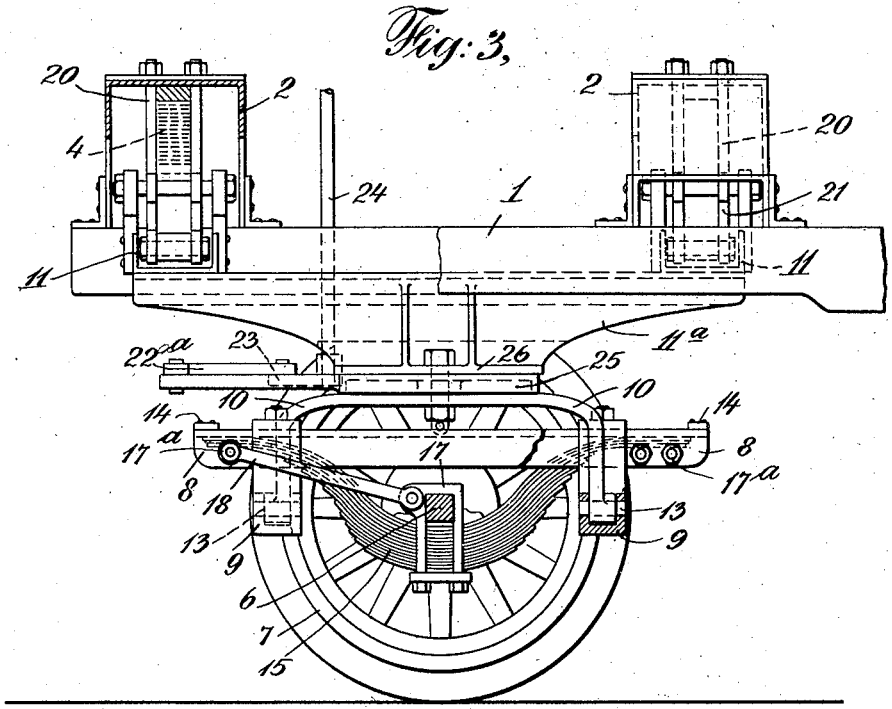
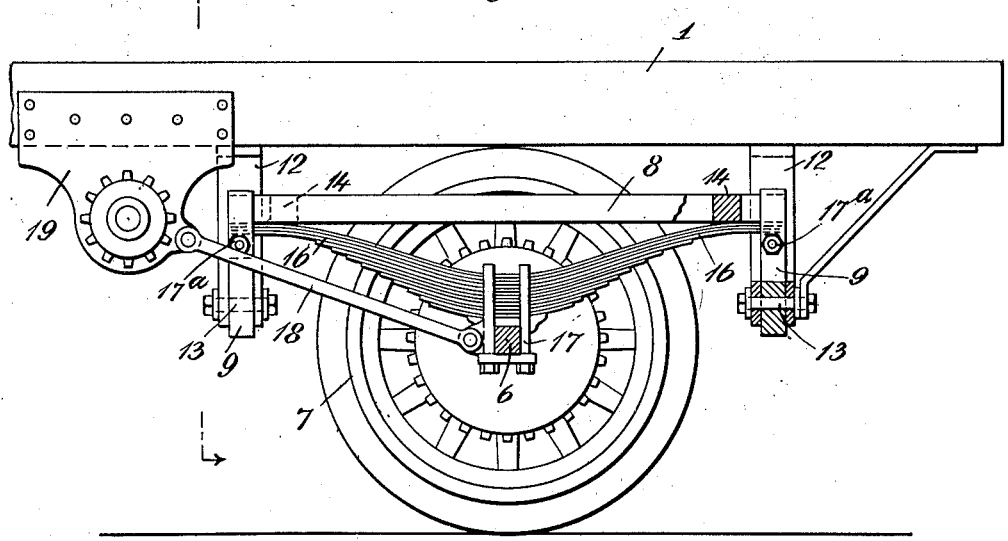

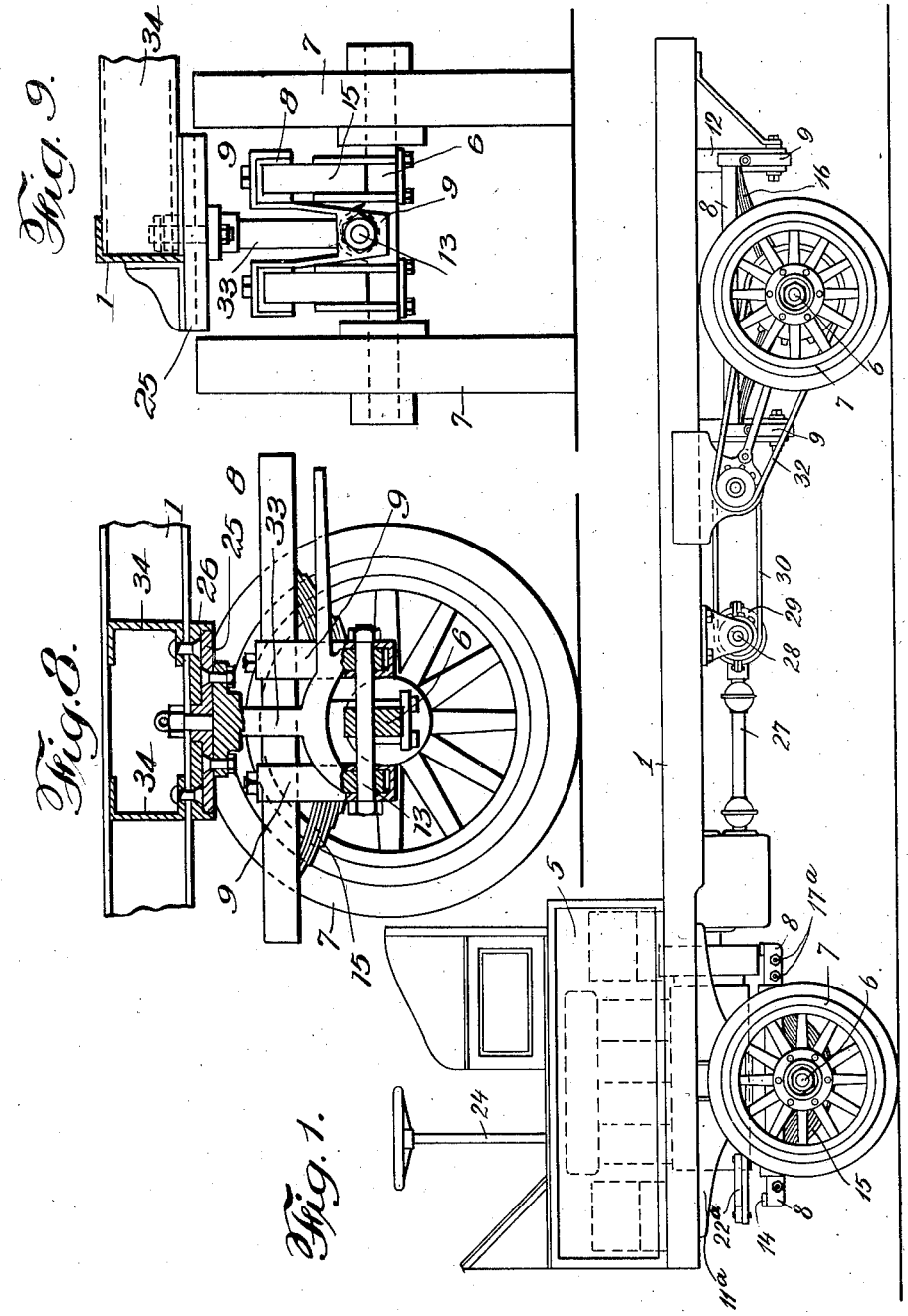

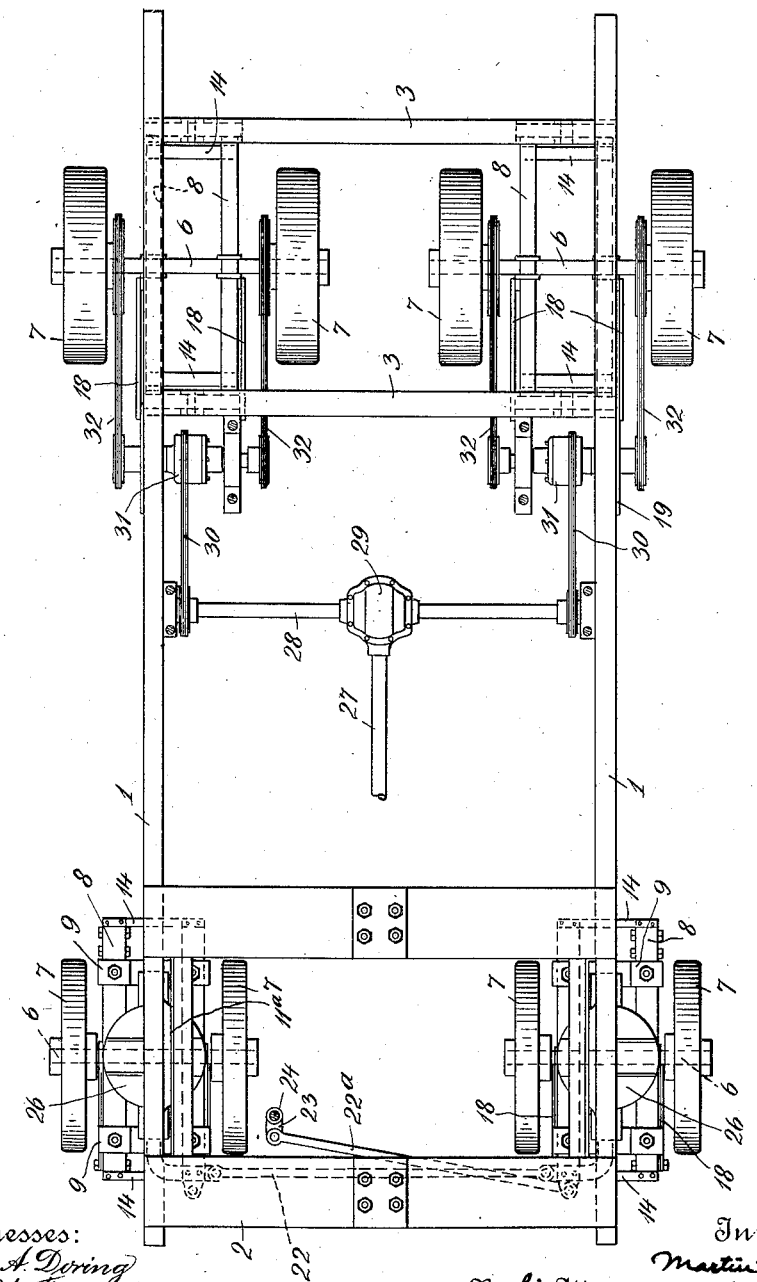

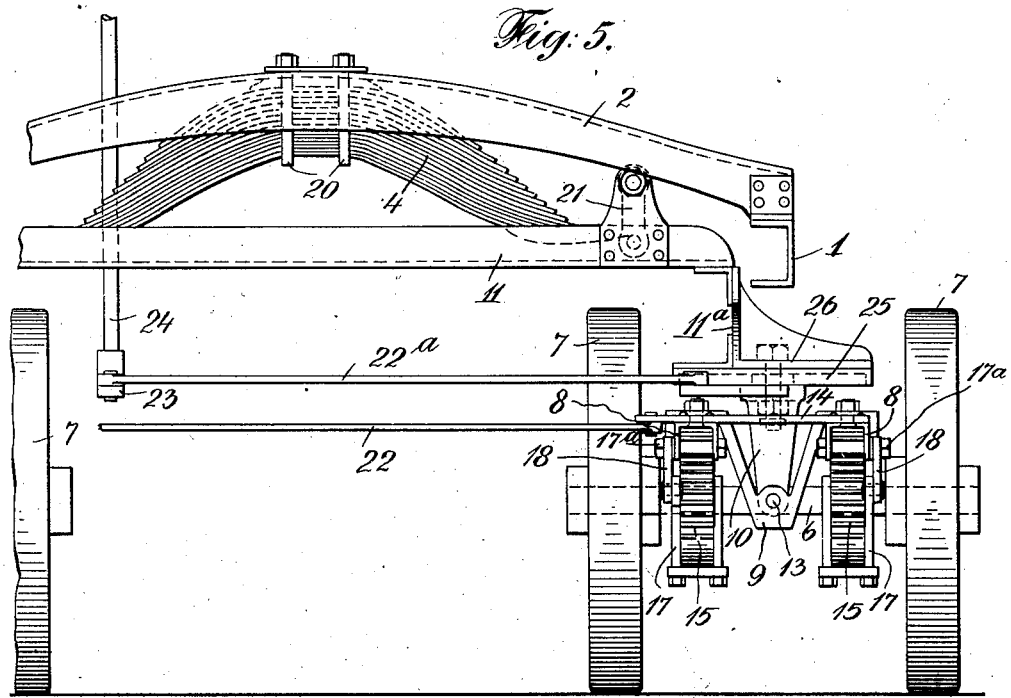
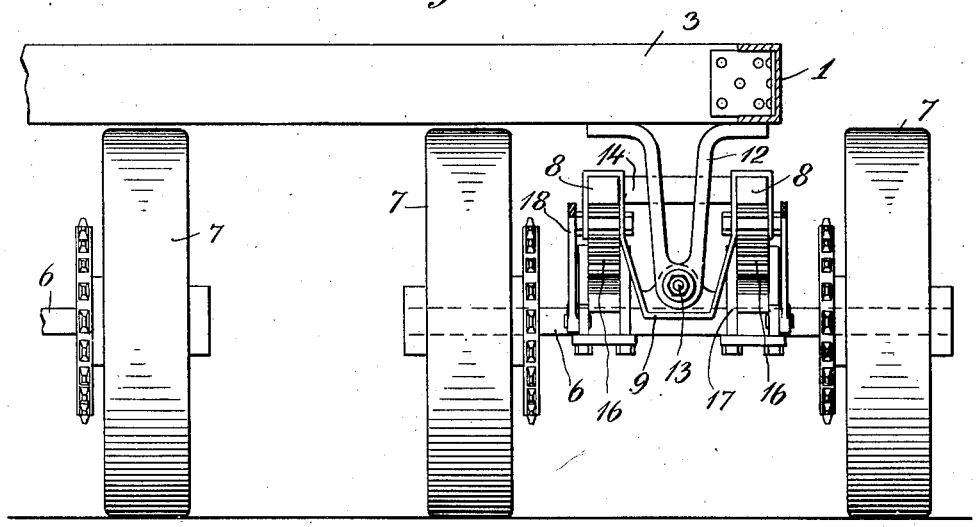

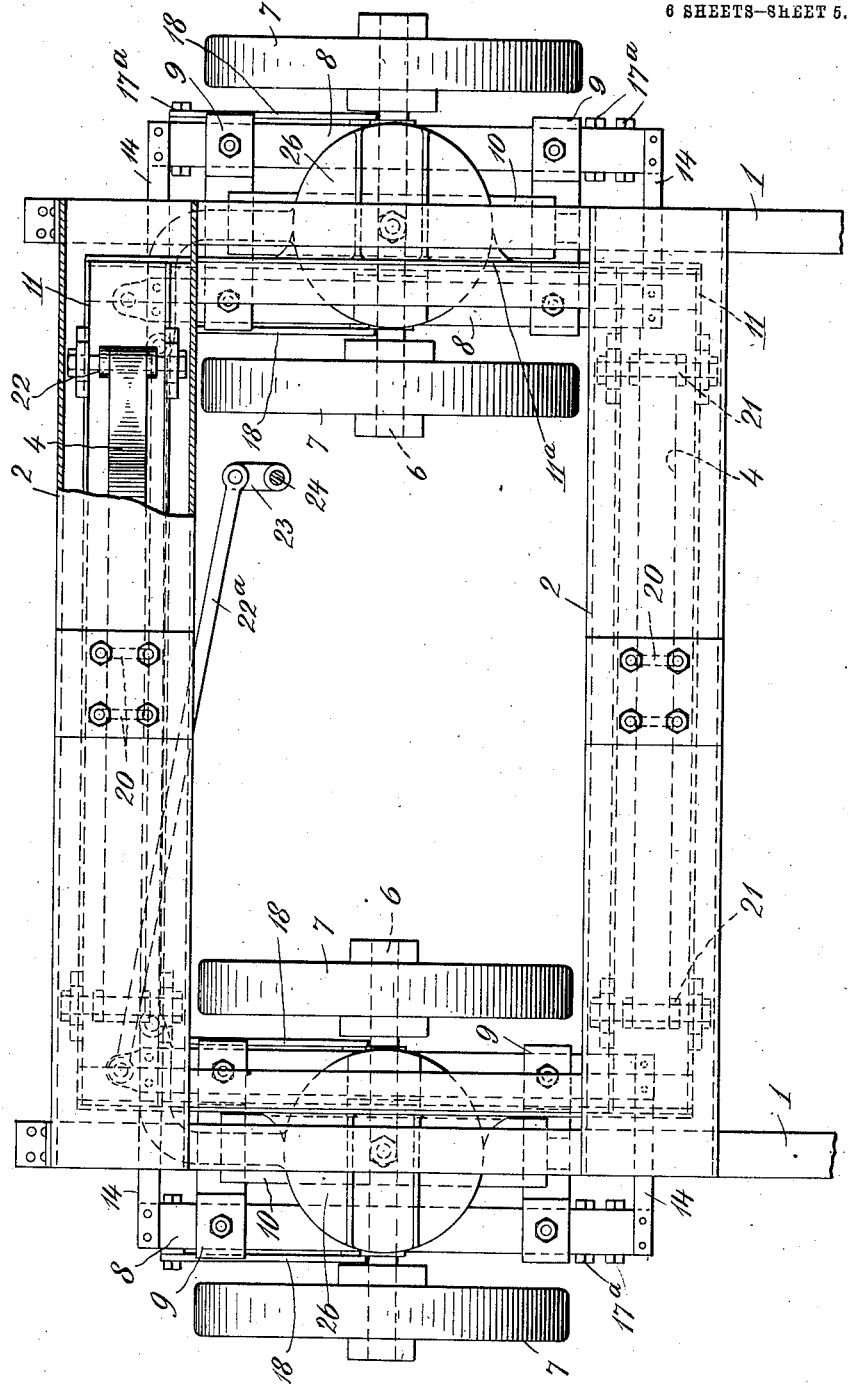

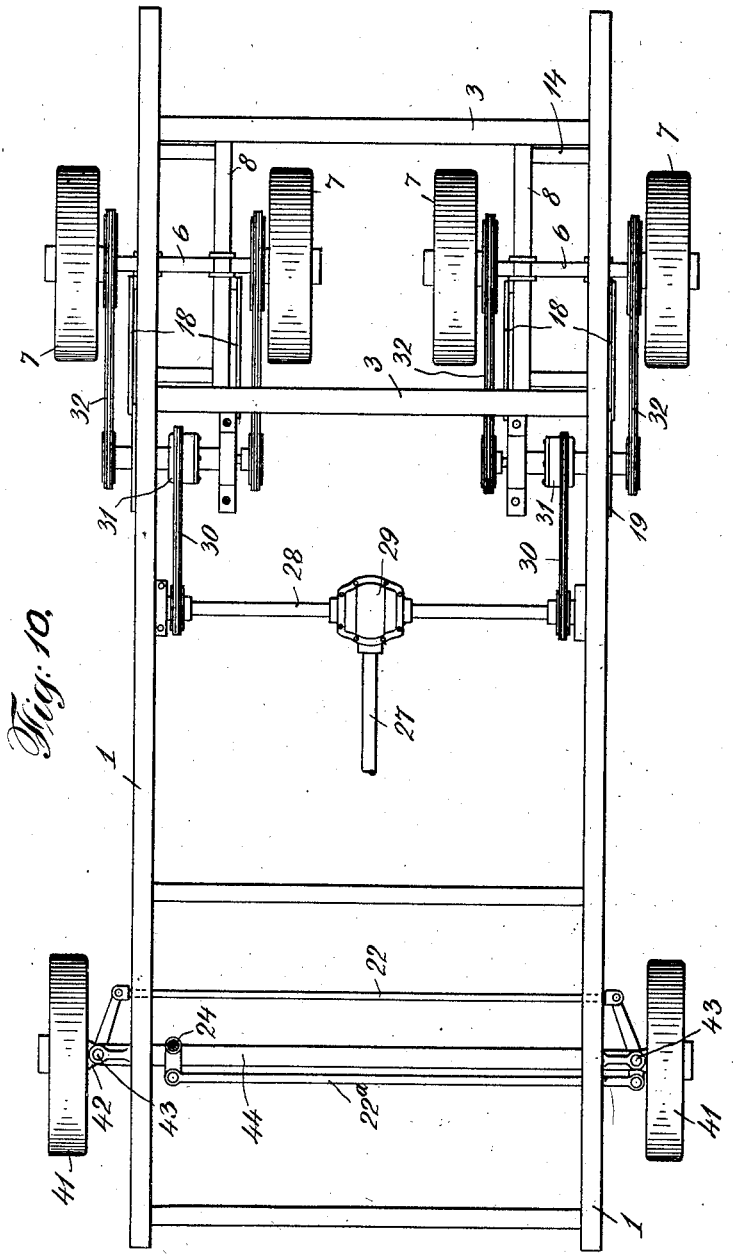

UNITED STATES PATENT OFFICE.

MARTIN L. SENDERLING, OF JERSEY CITY, NEW JERSEY.

VEHICLE.

1,095,127.  Specification of Letters Patent.  Patented Apr. 28, 1914.

Application filed May 22, 1911. Serial No. 628,667.

*To all whom it may concern:*

Be it known that I, MARTIN L. SENDERLING, a citizen of the United States, and a resident of Jersey City, in the county of Hudson and State of New Jersey, have invented certain new and useful Improvements in Vehicles, of which the following is a specification.

My invention relates to vehicles, particularly to those intended for carrying very heavy loads, and still more particularly to motor vehicles of large capacity, such for example as motor trucks.

It is well known that, in the ordinary four-wheel designs of motor vehicles, the practical load-carrying capacity is limited by the practical inability of wheels and rubber tires to carry loads in excess of five thousand pounds or thereabout per wheel, and to stand up under such loads in ordinary service for a sufficient length of time to render the use of the vehicle economical; also that ordinary unpaved roadways, and many paved roadways, cannot withstand without injury a load of more than five thousand pounds or thereabout per wheel, unless such wheels have a tire of a breadth which is impracticable and undesirable in many classes of heavy vehicles, motor trucks for example. It is well known that in many of the heaviest motor trucks now in use, the economical load carrying capacity per wheel has been exceeded.

According to the invention herein illustrated and described, I increase the number of wheels of the vehicle, without otherwise materially changing the type and general construction of the vehicle, by substituting, for each of two or more of the wheels of an ordinary vehicle, multi-wheel trucks so constructed, and provided with such load-distributing means, that the load on each truck is distributed with substantial uniformity to all of the wheels of the truck. In general, each of these trucks has two wheels only, though I do not limit myself to trucks of two wheels only. In some cases I employ only two of these multi-wheel trucks, in which case such trucks are usually located at the rear of the vehicle, and, in the case of a motor vehicle, the wheels of these trucks form the driving wheels of the vehicle; the steering wheels being of ordinary construction and arrangement. In other cases, and particularly where extremely heavy loads are to be carried, multi-wheel trucks are also provided at the other end of the vehicle and their wheels constitute also steering wheels of the vehicle.

My invention comprises, therefore, a vehicle wherein, in place of some or all of the single wheels of an ordinary vehicle, multi-wheel trucks are employed, together with means for distributing the load with approximate uniformity, to the several wheels of such trucks.

Further features of my invention will appear hereinafter.

The objects of my invention are to increase the effective load-carrying capacity of road vehicles, and particularly of motor vehicles, without exceeding permissible or desirable load-carrying capacity, per wheel and tire; to accomplish this object without materially altering the general design and structure of such vehicles; to distribute the load of the vehicle, with substantial uniformity, between the different front wheels, and between the different rear wheels.

Further objects of my invention will appear hereinafter.

I will now proceed to describe my invention with reference to the accompanying drawings, and will then point out the novel features in claims.

In the drawings: Figure 1 shows a side elevation of one type of motor vehicle embodying my invention, the engine and change speed mechanism being shown diagrammatically. Fig. 2 shows a top view of such vehicle, the engine bonnet and associated parts being omitted; Fig. 3 shows a side elevation and partial section of the front portion of such vehicle; Fig. 4 shows a side elevation and partial section of the rear portion of such vehicle; Fig. 5 is a fragmentary front elevation of the vehicle, the engine, engine bonnet, and associated parts being omitted; and Fig. 6 is a similar rear elevation of the vehicle; Fig. 7 shows a top view, on a larger scale than Fig. 2, of the front portion of the vehicle, the engine and associated parts being omitted; Fig. 8 shows a detail sectional elevation of an alternative construction, of truck, the section being taken on a longitudinal plane of the vehicle, and Fig. 9 shows a front elevation of the truck shown in Fig. 8. Fig. 10 is a view similar to Fig. 2, that is to say, is a plan view of the vehicle, indicating the use of two wheels only for the steering wheels.

Referring first to Figs. 1–7 inclusive, numerals 1 indicate the longitudinal bearers or main frame members or sills of a motor vehicle, and numerals 2, 2 and 3, 3 designate transverse frame members or sills. In the construction shown, the members 2, 2, near the front of the frame of the vehicle, are of arched form and are of deep channel section, are located above the longitudinal bearers 1, and in addition to their function as frame members, form housings for transverse springs 4 (the springs of the vehicle being arranged, as hereinafter described, to provide a three-point support for the vehicle frame). The space between the two transverse frame members 2 is well adapted for location in such space of an engine; and a bonnet 5 commonly covers this space. As will be seen particularly by reference to Fig. 2, in this vehicle, instead of providing four wheels only, I have provided a multi-wheel truck (in the construction shown, a two-wheel truck) in place of each of the single wheels of an ordinary vehicle. By this construction the number of wheels of a vehicle is doubled without otherwise materially changing the design of the vehicle and, as compared with a four-wheel vehicle of equal load-carrying capacity, the load per wheel is halved, provided efficient means, such as hereinafter described, be employed for distributing the load between the different wheels. Each of these multi-wheel trucks comprises an axle 6 (which, in the construction shown, is a "dead" axle, though I do not limit myself to use of dead axles); upon which axle, carrying wheels 7 are mounted in the ordinary manner. Each such truck further comprises longitudinal sills 8, connected, near their ends, by transverse stirrups 9. The front trucks each have in addition, a longitudinal arched pedestal 10 pivotally connected to a transverse carrying member comprising two cross-beams 11 of channel section and located beneath members 2 of the vehicle frame, and brackets 11ª connected to the ends of said beams 11; to which carrrying member 11 the ends of the front springs 4 are shackled as hereinafter described. The pivotal connection of the truck pedestals 10 to the brackets 11ª of the transverse member is of the nature of a fifth-wheel connection, and is described more fully herinafter. The trucks of the rear wheels are provided each with two pedestals 12 connecting the stirrups 9 with the transverse members 3. The pedestals 10 and 12 are pivoted at 13 to their respective stirrups 9, to permit independent transverse tilting of the several trucks with respect to the vehicle itself, as may be required to follow various curvatures of road surface while maintaining substantial uniformity of distribution of load between the wheels. The longitudinal sills 8 of each truck are cross-connected by transverse sills 14. It will be seen that the longitudinal sills 8 and transverse sills 14 of each truck constitute a rigid truck-frame; that the pedestals 10 of the front trucks and 12 of the rear trucks, distribute the load of the vehicle to the stirrups 9, and thence to the truck frames comprising sills 8 and 14. Such load is transferred from such truck frames to the axles 6 through springs which, in the construction shown in Figs. 1–7 inclusive, are leaf springs. Numerals 15 designate the springs of the front trucks, there being two such springs for each front truck, and numerals 16 designate the springs of the rear trucks, there being two such springs for each rear truck. These springs are connected to the axles 6, by clips 17, and their ends rest against the under sides of the sills 8, being confined at their ends by bolts 17ª, which bolts nevertheless permit the longitudinal motion of the ends of the springs with respect to said sills, necessary for spring action. The form of these springs 15 and 16 is such that, in compression, during the first part of the compression, the effective length of the spring in contact with the under side of the sill increases, correspondingly decreasing the effective length of the spring between its points of contact with the sill and its point of contact with the axle, the effect of which construction is that as the load on the spring becomes greater the spring becomes stiffer owing to decreased effective length.

The springs and mountings therefor shown herein form the subject-matter of a co-pending application for Letters Patent of the United States, filed the 18th day of March, 1914, and bearing Serial Number 825,530, to which cross reference is here made.

Suitable distance rods 18 are provided (two for each truck) the distance rods of the front trucks extending from the spring-clips 17, and so, in effect, from the axles 6, to the longitudinal sills 8; while the distance rods 18 of the rear trucks extend from the spring clips to fixed members 19 of the frame of the vehicle. The transverse springs 4 at the front of the vehicle, are connected by clips 20 to the transverse frame member 2, and at their ends are connected by shackles 21 to the transverse member 11 connecting the two front trucks. All of the load carried by the front trucks is transmitted from frame member 2 to spring 4 and thence, through member 11, to the two front trucks. Practically therefore the frame 1—2 of the vehicle is supported, in front, at a single point, namely, the center of the longitudinal line passing through the centers of the two springs 4. At the rear, the vehicle frame 1—3, is supported by the two pedestals 12, each connected to the spring structure of one of the two rear trucks. This constitutes, as will be seen, substantially a three point support.

Steering is effected in substantially the ordinary manner by means of the front trucks, each truck treated, in this respect, as if it were a single wheel. The frames of the two front trucks are connected by a link 22, hinge-connected to said truck frames, and one of the truck frames is also connected, by a link 22ª, to a lever 23 carried by a steering shaft 24. Each pedestal 10 of the two front trucks is provided at its upper end with a fifth-wheel 25 having a bearing in a foot 26 carried by the corresponding bracket 11ª.

I have indicated driving mechanism for the vehicle, comprising a longitudinal driving shaft 27 driving a transverse jack shaft 28, through a differential 29. The particular construction of this differential is not illustrated, as it may be any one of the customary differential gears. This transverse shaft 28 drives, by suitable means, such for example as chains 30, two other differentials, 31, one for each of the rear trucks, and these differentials 31 in turn drive the several rear wheels of the vehicle independently, by means of chains 32. As will be readily understood, the action of these differentials is such that, when the vehicle is changing direction, each of the driving wheels is driven at its proper relative speed.

The advantages of this structure above described, particularly where very heavy loads are to be carried, are numerous. Since eight carrying wheels are provided, where, according to ordinary constructions, only four carrying wheels would be provided, the load on each wheel is only half of what it would be in an equivalent four wheel construction, and the pressure of each wheel upon the roadway is half of what it would be in an equivalent four-wheel construction. Moreover, a greater number of springs are provided than in ordinary four wheel constructions, the load upon each spring being half of what it would be in an equivalent four wheel construction. The axles themselves are relatively short, and for this reason have greater strength than in ordinary four wheel constructions, and moreover these axles are not subjected to excessive bending action, as is the case when one of the wheels of a four-wheel construction mounts an obstruction or drops into a hole. The number of driving wheels being doubled, as compared with ordinary four-wheel constructions, there is greater traction with consequent less liability to slip; and so greatly is the traction increased that in many cases the use of metal tires is practicable where the use of such tires would not be practicable in equivalent four wheel constructions. This increase of traction also decreases grinding of roadways, due to slip of wheels, and correspondingly decreases the wear on the tires.

The use of eight carrying wheels instead of four brings the load upon the individual tires within the practicable load limit of rubber tires, even in the case of vehicles of from fifteen to twenty tons load capacity. The arrangement of wheels in pairs, each pair taking the place of a single wheel of the ordinary four-wheel construction, divides the thrust and throw experienced when mounting an obstruction or dropping into a depression in the roadway. Revolving the steering gears by pairs around a common center in turning, eliminates the grinding of tires commonly experienced in ordinary four-wheel constructions, as these tires do not swivel about a vertical axis. The three-point support of the vehicle frame eliminates excessive stresses on the frame commonly experienced, by four-point supported frames, when the vehicle encounters an obstruction or drops into a hole.

The construction of the several members of the vehicle frame or chassis, and of the several frame members of the trucks, is such that these parts may be of pressed-steel constructions, or may be simple forgings.

Figs. 8 and 9 illustrate an alternative construction of two-wheel truck, wherein the stirrups 9 are located relatively close to the axle, and wherein a single pivot pin 13 passing through the axle is provided for the swiveling of the two stirrups to the truck pedestal, here designated by the reference numeral 33; and owing to the relatively small distance between the two stirrups 9, in this construction, this pedestal 33 is of simple yoke form, secured at its upper end to the fifth wheel 25. I have also illustrated in this figure that the foot or bearing piece 26 for this fifth wheel may be secured directly to the floor frame of the vehicle, here designated by numeral 34. This latter construction does not provide a three-point support, but a three point support is not always required.

In the forms of vehicle above described, the point of pivotal connection of the pedestals to the saddles or other truck members, is quite low. This is desirable, as the stresses on the parts are much less when the point of connection is low than when it is high.

In Fig. 10 I indicate that it is not necessary that, in my vehicle, there be four steering wheels (such steering wheels being, customarily, the front wheels). In the structure shown in Fig. 10, the rear portion of the vehicle, that is to say, the driving wheels and driving gear therefor, are arranged the same as in Figs. 1–7 inclusive; but instead of having two trucks, of two wheels each, at the front of the vehicle, I have single wheels, 41, mounted on stub axles 42 pivoted at 43 to the main axle 44, steering gears such as ordinarily provided in motor vehicles being employed.

What I claim is:—

1. A road vehicle comprising a frame, and supporting wheels therefor comprising four wheels abreast, arranged in two groups of two each, axles for said wheels, a stirrup for each pair of wheels comprising a centrally depressed portion with a relatively elevated portion on each side of the depressed portion, pedestals projecting downward from said frame and having jointed connections with the depressed portions of said stirrups, and spring means interposed between the elevated portions of each such stirrup and the axle of the corresponding wheels.

2. A road vehicle comprising a frame, and supporting wheels therefor comprising four wheels abreast arranged in two groups of two each, an axle for each such group, spring means for each such group, and means having a joint connection, for transferring load of the vehicle to said springs, and distance rods connecting said axles to a portion of the frame which is fixed against longitudinal motion with respect to the frame.

3. A road vehicle comprising a frame, and supporting wheels, certain of which are arranged abreast, an axle for two wheels so arranged, two leaf springs for such axle, spaced apart laterally, and connected to the axle, stirrups connecting corresponding ends of said springs and having depressed portions located between said springs, and means projecting downward from the frame of the vehicle and pivotally connected to said stirrups and so supporting the vehicle frame.

4. A road vehicle comprising a frame, and supporting wheels, certain of which are arranged abreast, an axle for two wheels so arranged, two leaf springs for such axle, spaced apart laterally, and connected to the axle, stirrups connecting corresponding ends of said springs and having depressed portions located between said springs, and means projecting downward from the frame of the vehicle and pivotally connected to said stirrups and so supporting the vehicle frame, and a distance rod connecting said axle to a portion of the frame which is fixed against longitudinal motion with respect to the frame.

5. A road vehicle comprising a frame, and supporting wheels therefor comprising two sets, the wheels of each set arranged abreast, springs for said wheels, framework comprising a transverse member interposed between the springs of one such set of wheels and the vehicle frame, and a transverse leaf spring interposed between the vehicle frame and the said transverse member, said transverse spring connected near its center to one of the parts between which it is interposed, and connected non-rigidly to the other of said members between which it is interposed.

6. A vehicle comprising a frame having a plurality of longitudinal sills and a plurality of cross sills, two such cross sills arranged near one end of such frame but spaced apart, vehicle wheels comprising two series, the wheels of each series arranged abreast, axles and springs for said wheels and a framework interposed between the springs of one of said series of wheels and the vehicle frame, and comprising a transverse member, and leaf springs interposed between the two proximate transverse sills of the vehicle frame, and the said transverse member, said leaf springs connected near their middle to one of the parts between which they are interposed, and connected non-rigidly at their ends to the other of the parts between which they are interposed.

7. A vehicle comprising a frame comprising longitudinal sills and cross sills, two of said cross sills arranged near each other and each of inverted channel-section, supporting wheels arranged in two series, the wheels of each series arranged abreast, axles and springs for said wheels, and a frame work connecting the axles of the wheels of one of said series and comprising transverse members located substantially beneath the said sills of channel-section, and leaf springs between said transverse members and channel-section sills and seated in the channels of such sills.

8. A vehicle comprising a frame having a plurality of longitudinal sills and a plurality of cross sills, two such cross sills arranged intermediate the ends of such frame but spaced apart, vehicle wheels and springs for said wheels and a frame-work interposed between the said springs and the said vehicle frame, and comprising transverse members, and leaf springs interposed between said transverse members and the said transverse sills of the vehicle frame, said leaf springs connected rigidly to one of the parts between which they are interposed, and connected non-rigidly to the other of the parts between which they are interposed.

9. A vehicle comprising a frame, pedestals rigidly pendant from said frame, wheels, and springs therefor, the pedestals being in proximity to the ends of said springs, and frame-work comprising stirrups which are rigid parts thereof, said frame-work mounted upon said springs, said stirrups being each located in proximity to one of said pedestals and pivotally connected to it.

In testimony whereof I have signed this specification in the presence of two subscribing witnesses.

MARTIN L. SENDERLING.

Witnesses:
 H. M. MARBLE,
 D. A. DAVIS.